(12) United States Patent
Abe et al.

(10) Patent No.: US 7,674,128 B2
(45) Date of Patent: Mar. 9, 2010

(54) IN-VEHICLE ELECTRONIC DEVICE

(75) Inventors: Hiroyuki Abe, Hitachiomiya (JP); Akira Takasago, Hitachinaka (JP); Shinya Igarashi, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/193,478

(22) Filed: Aug. 18, 2008

(65) Prior Publication Data

US 2009/0088020 A1    Apr. 2, 2009

(30) Foreign Application Priority Data

Sep. 28, 2007   (JP) .............................. 2007-252960

(51) Int. Cl.
*H01R 13/52*   (2006.01)
(52) U.S. Cl. ...................................... 439/519
(58) Field of Classification Search ................. 439/519, 439/271, 274, 275; 422/104, 83, 51; 436/147
See application file for complete search history.

(56) References Cited

U.S. PATENT DOCUMENTS 4,824,390 A     4/1989   Crane et al.
5,548,996 A     8/1996   Shinjo
6,997,051 B2 *  2/2006   Okazaki et al. ........... 73/204.22
7,255,837 B2 *  8/2007   Abe et al. .................... 422/104
2003/0087448 A1 * 5/2003  Abe et al. ....................... 436/73

FOREIGN PATENT DOCUMENTS

| EP | 1 295 905 A1 | 3/2003 |
| EP | 1 310 773 A2 | 5/2003 |
| EP | 1 400 786 A2 | 3/2004 |
| JP | 2946008 B2   | 7/1999 |
| JP | 2003-139593 A | 5/2003 |
| JP | 2006-138841 A | 6/2006 |

OTHER PUBLICATIONS

European Search Report dated Aug. 18, 2009 (Three (3) pages).

* cited by examiner

*Primary Examiner*—Chandrika Prasad
(74) *Attorney, Agent, or Firm*—Crowell & Moring LLP

(57) ABSTRACT

The present invention improves reliability of an in-vehicle electronic device against corrosive gases. A trapping agent that has trap performances (adsorptive performance, suction performance, absorption performance, chemical reactivity, etc.) that are higher than that of water vapor with respect to corrosive gases other than water vapor is held within a connector having a terminal that is insert-molded in a case housing an electronic circuit. Here, the trapping agent may be held in a counterpart connector of the connector integrally formed in the case.

13 Claims, 7 Drawing Sheets

IN-VEHICLE ELECTRONIC DEVICE

BACKGROUND OF THE INVENTION

Field of the Invention

The present invention relates to an in-vehicle electronic device, and particularly to an in-vehicle electronic device which is installed in an engine room.

A structure for preventing corrosion of an in-vehicle electronic device has been known. In such structure, activated carbon or a metal is blended with an adhesive for bonding a metal base and a resin case of an in-vehicle electronic device, so that corrosive gases permeating this adhesive are trapped (see Japanese Patent Application Publication Nos. 2003-139593 and 2006-138841). In this case, a silicone adhesive is mainly used as the adhesive.

In addition, a technique is known where a gel seal member is placed around a terminal in a connector body (coupler), and corrosion due to water vapor is prevented (Japanese Patent No. 2946008).

SUMMARY OF THE INVENTION

Many in-vehicle electronic devices have a structure in which a connector is integrally formed in a case with an electronic circuit housed therein. The above-mentioned patent documents do not consider that, in such a structure, corrosive gases other than water vapor in a connector are generated and these generated corrosive gases intrude into the inside of the case with the electronic circuit installed therein.

It is an object of the present invention to improve reliability of an in-vehicle electronic device used under in-vehicle environments against corrosive gases.

To achieve the above object, the an in-vehicle electronic device of the present invention keeps, within a connector having a terminal that is insert-molded in a case that houses an electronic circuit, a trapping agent that has trap performances (adsorptive performance, suction performance, absorption performance, chemical reactivity, etc.) that are higher than that of water vapor with respect to corrosive gases other than water vapor. In this case, the trapping agent may be held in a counterpart connector of the connector integrally formed in the case. Moreover, the inside of the connector includes the inside of a member that forms the connector. In other words, the inside of the connector includes the inside rather than the outside surface of the connector.

The present invention can prevent corrosive gases generated within the connector from intruding into a case that houses the electronic circuit to thereby improve reliability, against corrosive gases, of an in-vehicle electronic device exposed to severe environmental conditions, particularly in an in-vehicle electronic device equipped in an engine room.

DESCRIPTION OF THE PREFERRED EMBODIMENTS

This application is based on the Japanese Patent application JP2007-252960, all the contents of which is incorporated in this application by reference.

The best mode of the present invention is achieved by setting a gasket of rubber produced by blending a trapping agent that traps corrosive gases in a connector which consolidates input/output signals for an in-vehicle electronic device. In addition, a similar effect is achieved even by a method of burying the gasket of rubber in a connector bottom by use of an adhesive. Moreover, there is a method of pasting to a connector an adhesive seal with which a corrosive gas trapping agent is blended, and there is also a method of potting and hardening in the bottom of a connector a paste resin with which a corrosive gas trapping agent is blended.

Moreover, a similar effect is achieved by forming a counterpart connector with use of a member with which a trapping agent that traps corrosive gases is blended in waterproof rubber of a counterpart connector harness, Grommet Rubber of a wire harness, or a coupler of the counterpart connector. The above harnesses transmit a signal between an electronic device that serves as a physical amount detection device and electronic device that serves as a control unit.

The object of the present invention is represented as a method of improving reliability of the in-vehicle electronic device against corrosive gases. The corrosive gases targeted by the present invention do not include water vapor, but include cyclic sulfur gas ($S_8$) being a single gas of sulfur, which is a specific corrosive gas generated in an engine room of an automobile. The corrosive gases additionally include: a general sulfur compound gases such as hydrogen sulfide ($H_2S$), carbon disulfide ($CS_2$), sulfur dioxide ($SO_2$) and carbon oxysulfides (COS); nitrogen oxide gases (NOx); and gases of hydrocarbons (HC); chlorine-based gases; fuel vapors (mixture fuels of gasoline, light oil, ethanol, or the like); and further, mixtures of gases mentioned above.

Embodiment 1

The present invention will be described with reference to FIGS. 1 to 17.

Figure 1:
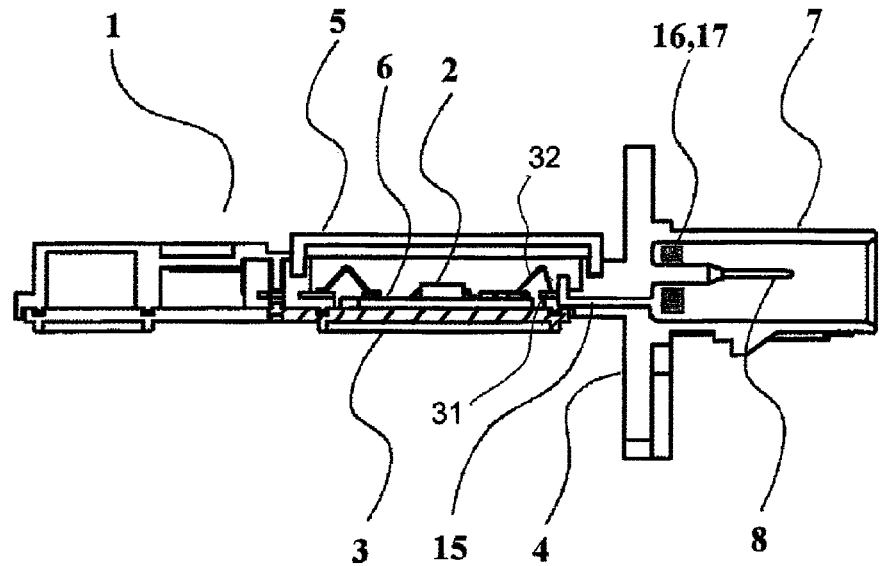
FIG. 1 is a sectional structural view of an in-vehicle electronic device according to the present invention, which is taken in a direction along a side face of the in-vehicle electronic device.
Figure 2:
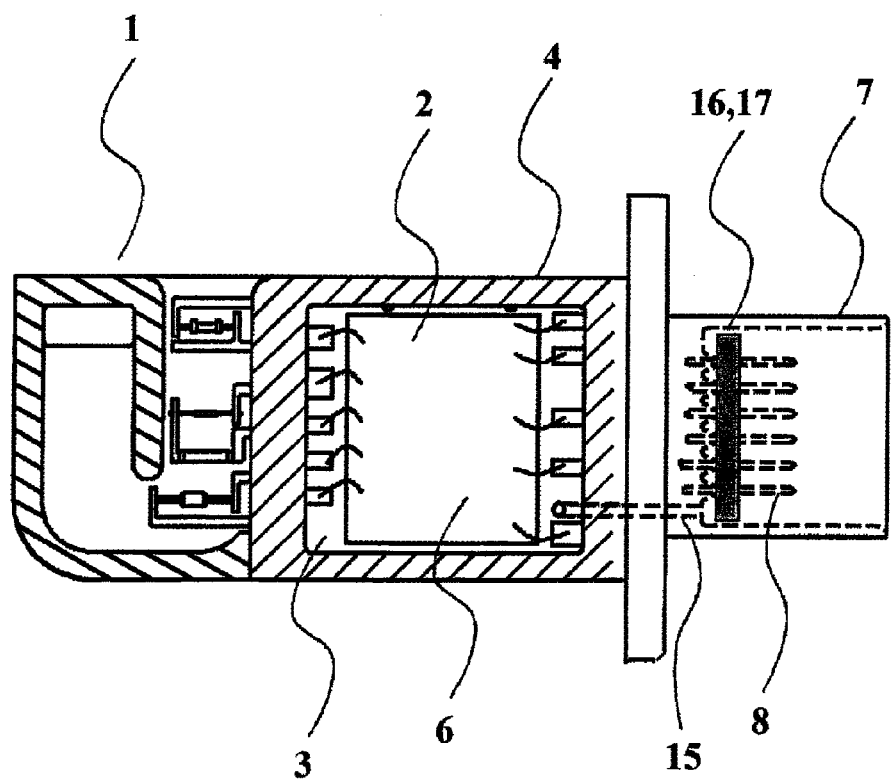
FIG. 2 is a sectional structural view taken in a horizontal direction of an in-vehicle electronic device according to the present invention.

FIG. 1 is a sectional structural view of an in-vehicle electronic device according to the present invention. FIG. 2 is a planar structural view of an in-vehicle electronic device according to the present invention.

A general structure of an in-vehicle electronic device is described in FIG. 1. An in-vehicle electronic device is roughly divided into a sensor, a throttle control device of a control unit and an ignition controller of an igniter and a coil. The sensor detects physical values such as an intake air flow, an EGR flow rate, the temperature of air, the atmospheric pressure, boost pressure, a throttle angle, and a stroke position; the control unit has functions of receiving a signal from the sensor, controls combustion conditions in the cylinder; and the igniter and the coil have a function of controlling ignition timing in the cylinder.

In an in-vehicle electronic device 1, a metallic or resin base 3 on which an electron driving circuit 2 (or, electronically controlled circuit) is set up is bonded and fixed to a case 4 that accommodates the electron driving circuit 2. In addition, a cover 5 is bonded and fixed to the case 4 so as to cover the upper surface of the electron driving circuit 2 and the base 3. The electron driving circuit 2 is formed on a hybrid IC substrate 6, which is bonded and fixed to the base 3. For the hybrid IC substrate 6, used is any one of a substrate formed with inorganic materials such as ceramics, glass ceramics (LTCC), etc., and a glass epoxy substrate. On the surface of the substrate, conductor wiring of being a conductor of the circuit and a resistance are printed and burned obtaining a protection film formed. Thereafter, a capacitor, a diode, and a semiconductor integrated circuit are mounted on the surface of the substrate. When the base 3 is used to serve as a heat sink of heat radiation, a metal with a high thermal conductivity, particularly, aluminum is frequently used. Moreover, on the surface of a substrate formed with an inorganic material such as ceramics or glass ceramics (LTCC) or of a glass epoxy substrate, silver or copper that serves as a conductor wiring of a circuit is frequently used.

The case 4 that accommodates the hybrid IC substrate 6 (also simply called an electronic circuit substrate) and a cover 5 that covers the upper surface have a form that integrally combines with a connector 7 that is an input/output signal interface of the hybrid integrated circuit substrate 6. The case 4 and the cover 5 insert-mold a terminal 8 constituted of an electroconductive member that governs the transmission of an electrical signal into the inside of resin that forms the case 4. In addition, the bodies of the case 4 and the connector 7 are integrally formed of resin. Here, a sensor that detects physical values such as the inhalation air temperature, the intake air flow rate, the EGR flow rate, the throttle position or angle, the stroke position, and the inhalation air pressure has a structure in which a sensing element is placed outside or in the case opening part. Moreover, the sensor is electrically connected to the outside through the electron driving circuit 2 and the terminal 8. As a resin that forms the case 4 and the cover 5, employed is a resin that is excellent in injection-molding processabilities, such as polybutyrene terephthalate (PBT), polyphenylene sulfide (PPS), nylon 6, nylon 66, nylon 11, nylon 12, or polycarbonate (PC).

Here, since both the case 4 and the base 3 are greatly different in coefficients of linear expansion, they may be bonded and sealed with an elastic binder that has viscoelasticity like a silicone adhesive. In addition, if the case 4 and the cover 5 are formed of the same material, they may be bonded with an epoxy adhesive; if they are formed of different materials, a silicone adhesive may be used.

The use environments and the problems of an in-vehicle electronic device will be described hereinafter.

An in-vehicle electronic device 1 installed in an engine room is exposed to severe use environments and always has the problem of corrosion. For instance, an air flowmeter is often installed in a rubber duct between an air cleaner and a throttle valve. Sulfur gases, particularly a cyclic sulfur gas ($S_8$) of a single substance, hydrogen sulfide ($H_2S$), carbon disulfides ($CS_2$), and carbon oxysulfides (COS) are generated from a rubber duct. Moreover, sulfur dioxide ($SO_2$), nitrogen oxide (NOx), and gas material (HC) of hydrocarbons from a combustion chamber of an engine due to the return of combustion gases, and unburned gases and fuel vapors (gasoline, light oil, and biofuels such as ethanol fuels) from the combustion chamber, are filled in the duct together with vapor of an engine oil. The air flowmeter is always exposed to such corrosive gases, and improvement of reliability against the corrosive gas leads to security of the quality and the reliability of automobiles.

However, in in-vehicle electronic devices including an air flowmeter, many structures produced by bonding the base 3 and the resin case 4 with an adhesive, particularly, with an adhesive of a silicone series are employed. Corrosive gases as described above might be generated from this silicone adhesion part. The generated corrosive gas intrudes into the inside of the case 4, and if there is a part in which conductor wiring constituted by silver or copper is exposed on the surface of the circuit of hybrid IC substrate 6, the generated corrosive gas corrodes the exposed part. In addition, it keeps corroding the conductor wiring of silver or copper by the time the concentration of the corrosive gas becomes 0 around the base point of corrosion. If the conductor wiring corrodes, normal operation of the circuit may become impossible.

In order to cope with corrosive gases generated from a silicone adhesive in bonded parts of the base 3 and the case 4, it is effective to give the silicone adhesive a function of trapping the corrosive gas as disclosed in Japanese Patent Application Publication No. 2003-139593 or Japanese Patent Application Publication No. 2006-138841. However, another source of corrosive gases is also present.

In in-vehicle electronic devices, the connector 7 that consolidates input/output signals becomes an interface part with the outside and transmits a signal. The structure and the function of this connector 7 are described with reference to FIG. 3.

In an in-vehicle electronic device, metal terminals 31 are insert-molded to the case 4. The electronic circuit of the hybrid IC substrate 6 is electrically connected to the terminal 8 via wire 32 or the like. These insert-molded metal terminals are independently provided for the signals and are combined with the terminals 8 to transmit individual signals. Here, PBT is frequently used for the case 4, and a nickel plated, tin plated or gold plated brass is used for the terminal 8 to be insert-molded.

A counterpart connector 9 which governs the transmission of input/output signals from the in-vehicle electronic device 1 includes: a coupler 10 molded in a shape which agrees with the shape, terminal size, and position of the connector 7 of the in-vehicle electronic device 1, and which enables the connector 9 to be fitted and fixed to the connector 7; a waterproof rubber 11 that prevents intrusion of moisture from the outside and keeps sealing properties; a terminal 12 that fits into the terminal 8 of an in-vehicle electronic device and transmits electrical signals; a wire harness 13 of an electric wire; and Grommet Rubber 14 which is placed in a coupler 10 and which adheres to the wire harness 13. Coupler 10 is mainly formed with PBT in many cases. Silicone rubber, polyurethane elastomers, NBR, and the like are used for the waterproof rubber 11 and Grommet Rubber 14, while silicone rubber is frequently used for rubber of the in-vehicle electronic device 1 in an engine room. A molded article of copper which is tin or gold plated is often used for the terminal 12, and the wire harness 13 is swaged to the terminal 12 using a copper wire.

A ventilating hole 15 is provided in the connector 7 of the in-vehicle electronic device 1. The in-vehicle electronic device 1 is mostly assumed to be used in the temperature range of from −40 to 125° C. The in-vehicle electronic device 1 is often provided with an escape of air, called the ventilating hole 15, in order to secure the durability of the in-vehicle electronic device 1. The ventilating hole 15 is an escape of air that connects the inside of the case 4 accommodating the hybrid IC substrate 6 to the inside of the connector 7.

Figure 4:
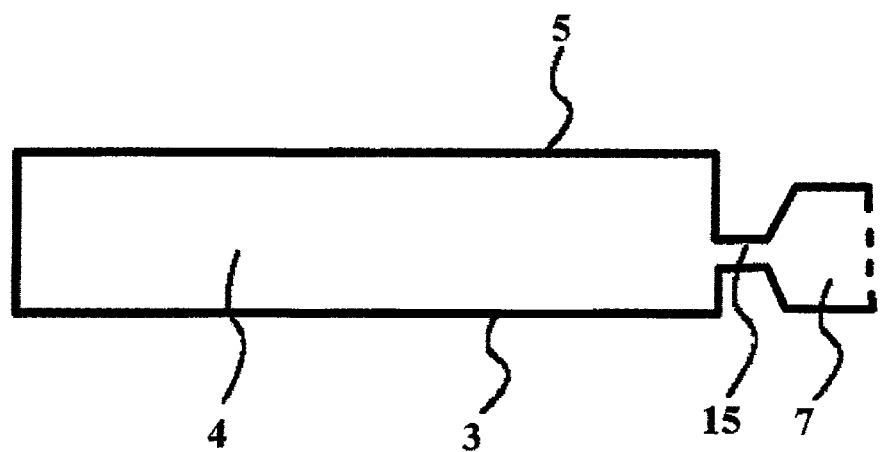
FIG. 4 is an image of a ventilating hole of general electronic device.
Figure 5:
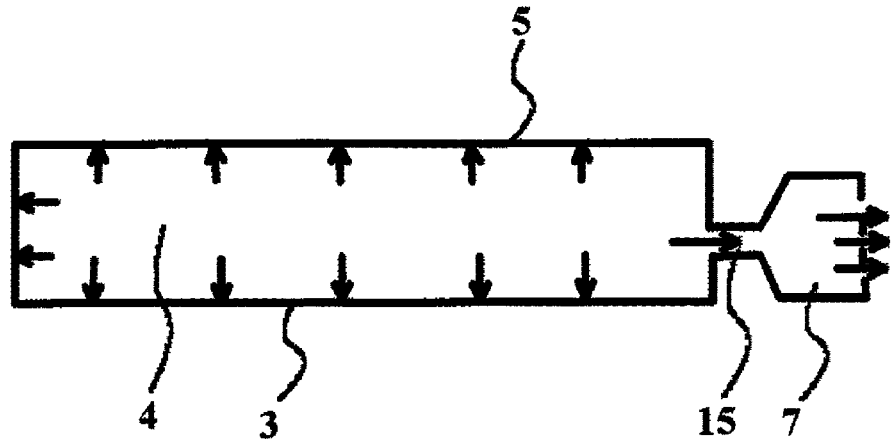
FIG. 5 is an image in an internal pressure state when general electronic device becomes high in temperature.
Figure 6:
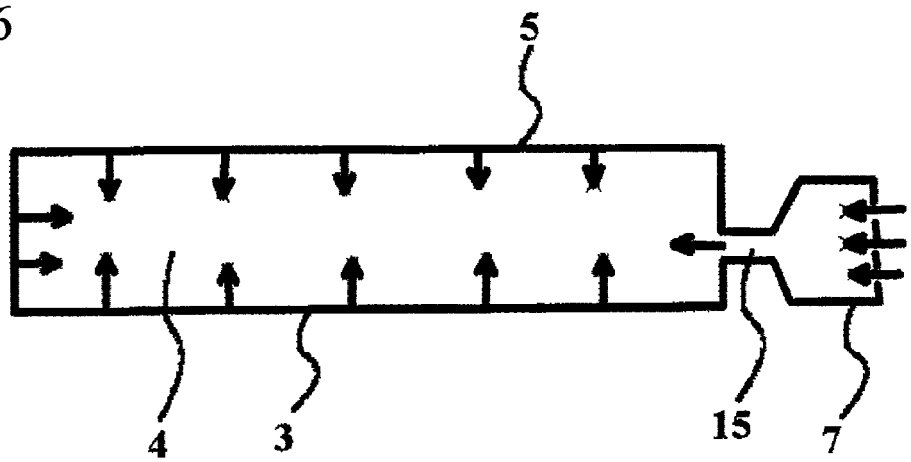
FIG. 6 is an image in an internal pressure state when general electronic device becomes low in temperature.

FIG. 4 is a schematic diagram of the case 4 when there is the ventilating hole 15. The ventilating hole 15 is an escape of air between the insides of the case 4 and the connector 7. When temperature increases, air expands with temperature rise within the case 4, and the internal pressure increases; and this expanded air escapes to the side of the connector 7 through the ventilating hole 15 as shown in FIG. 5, and further, diffuses inside the wire harness 13. Moreover, when the temperature decreases, the situation becomes a reverse-operation as shown in FIG. 6, where air in the case 4 shrinks and the pressure inside the case 4 becomes negative. Here, by sucking air inside the connector 7 and the wire harness 13 via the ventilating hole 15, the inside and the outside of the case 4 take a pressure balance to always keep a condition of equilibrium.

Figure 7:
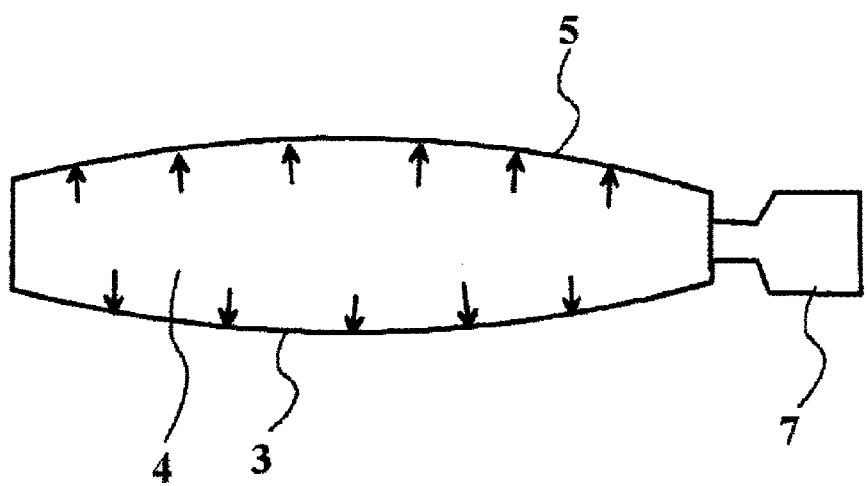
FIG. 7 is an image in an internal pressure state at a high temperature in electronic device in which the case is a completely encapsulated-type.
Figure 8:
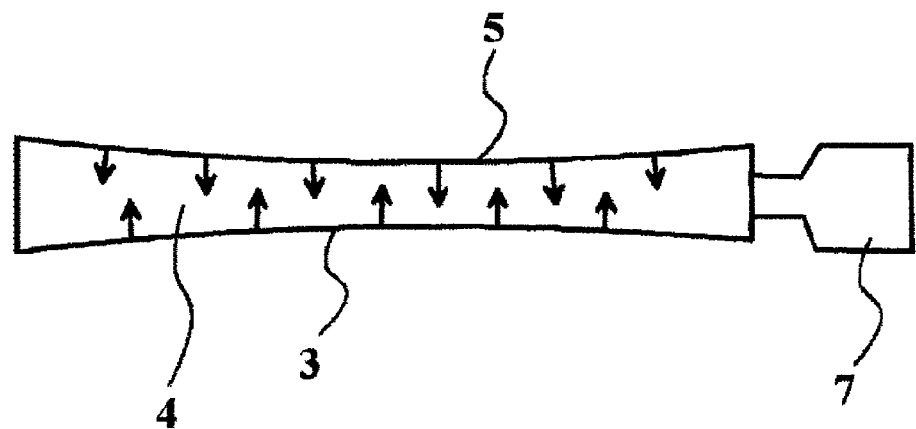
FIG. 8 is an image in an internal pressure state at a high temperature in electronic device in which the case is a completely encapsulated-type.

When the inside of the case 4 and the outside are in hermetic sealing in the absence of the ventilating hole 15, as shown in FIG. 7, air in the inside of the case 4 may expand with increasing temperature in the inside of the case 4, and the internal pressure may increase, and therefore the entire case 4 is swollen. In addition, when the temperature decreases, the situation becomes a reverse-operation, where air in the inside of the case 4 shrinks, and an action that warps the case 4 inward takes place, as illustrated in FIG. 8. In the case structure of such a complete encapsulation type, an increase and a decrease in temperature are repeated and its distortion is increased in time lapse. As a result, the case is subjected to generation of cracks and is easily damaged, causing peeling at the adhesion interface in the bonded part, and the reliability decreases remarkably.

Therefore, the ventilating hole 15 is an important mechanism that guarantees reliability of the in-vehicle electronic device 1.

However, here, the rubber products of the waterproof rubber 11 and the Grommet Rubber 14 are present within the connector 7. There is a fear that corrosive gases might be generated when these rubber products are vulcanized rubber products using an additive such as a sulfur compound, or sulfur. With the in-vehicle electronic device 1 installed in the engine room, the device naturally reaches a high temperature, and it is cooled before long. The examples include a case where an automobile is run at a high speed, is stopped, and then enters a state of idling. In such a state, the case 4 part in the duct is suddenly cooled with the idling air. However, the connector 9 of the in-vehicle electronic device 1 is outside the duct, and no medium like cooling air is present, so that the temperature remains high. Since the case 4 having a high temperature is rapidly cooled with the idling air, the air in the case 4 shrinks and the pressure inside the case 4 becomes negative. Then, air flows in from the ventilating hole 15, thus maintaining the pressure balance. In other words, what happens is that air inside the connector 9 flows into the inside of the case 4 in the use environments of an automobile.

If rubber parts that make up the connector 9 are the sulfur vulcanization goods, or are rubber products with which a sulfur compound is blended, when the connector reaches a high temperature, a cyclic sulfur gas of a sulfur single substance or a sulfur compound gas are generated from the rubber with which the sulfur vulcanization rubber or the sulfur compound are blended.

When negative pressure is generated inside the case 4, corrosive gases such as a sulfur single substance gas and a sulfur compound gas generated within the connector 9 easily flows into the case 4. Then, the corrosive gas that flows into the case 4 chemically reacts with the conductor of the hybrid IC substrate 6 and corrodes the conductor, and the circuit has a possibility of entering a state of malfunction or a state of no circuit outputs.

In addition, since the coupler 10 of the counterpart connector 9 has a thin wall and a complex shape, a sulfur compound is frequently blended with an additive that improves liquidity of resin at injection molding, an additive to secure resin stability at a high temperature, and an additive blended with resin as a stabilizer for prevention of a change in the lapse of time, whereby a sulfur-based corrosive gas may be generated also from the coupler. Moreover, if a sulfur compound is blended also with a mold lubricant applied to a shaping die for the purpose of easy extraction of the coupler 10 from the shaping die, the mold lubricant adheres to the surface of the coupler 10, and a sulfur compound may be generated at a high temperature.

An object of the present invention is to prevent the corrosion of conductor wiring constituted by silver, copper, and silver alloy materials, the conductor wiring of the hybrid IC substrate 6 accommodated within the case of the in-vehicle electronic device 1 which is obtained by a structure having a ventilating hole as described above and is set up in an engine room. In particular, the manufacturer that manufactures the in-vehicle electronic device 1 has findings and experiences against such corrosion, and can consider having environments without corrosive gases and using materials that do not contain sulfur, in regard to composition materials and through the manufacturing process. On the other hand, as for the counterpart connector 9, the generation of corrosive gases is not always considered in its manufacturing method and selection of materials.

Therefore, when there is a source of corrosive gases in the counterpart connector 9, it is necessary to prevent the inflow of corrosive gases into the case 4 and improve reliability of the in-vehicle electronic device 1 against corrosive gases.

In addition, in a structure in which the ventilating hole 15 is not positively disposed, there is a possibility that a passage of corrosive gases is formed by, for example, a minute space generated between the case and the connector 7 constituted by a resin of the terminal. For this case also, the present invention is effective.

Specific contents are presented below.

Figure 9:
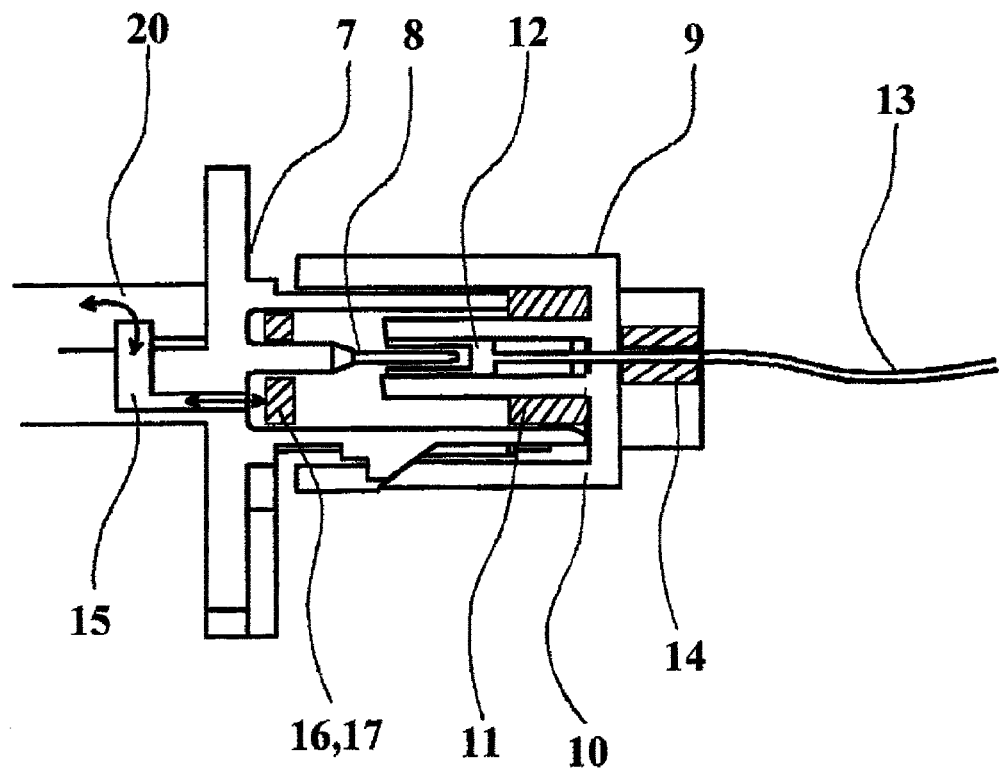
FIG. 9 is a sectional structural view in a fitting part of the connectors of an in-vehicle electronic device according to the present invention.

FIG. 9 is a detailed sectional view of the connector 7 of the in-vehicle electronic device shown in FIGS. 1 and 2. Reference numeral 16 shows a supporter constituted so as to fit the internal shape of the connector 7 of the in-vehicle electronic device 1. This supporter 16 is blended with a trapping agent for trapping corrosive gases by adsorption, absorption, suction or chemical reaction, and is a medium for distributing and maintaining a trapping agent.

Figure 10:
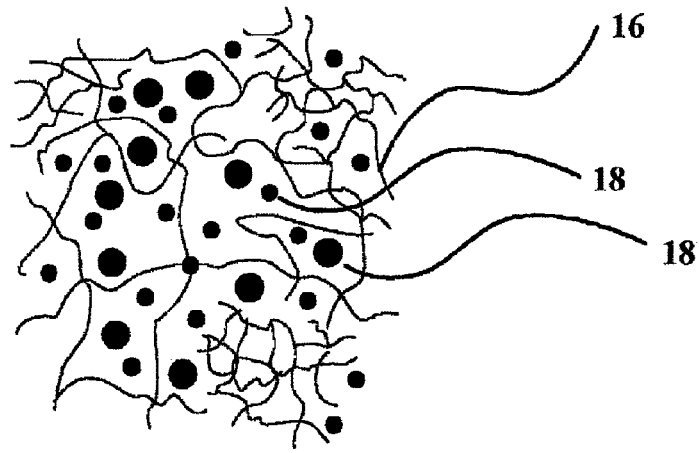
FIG. 10 is a structural view of a corrosive gas trapping agent to be set in a connector of an in-vehicle electronic device according to the present invention.

In this embodiment, as a trapping agent 17, activated carbon 18 is dispersed in and blended with the supporter 16 as indicated in FIG. 10. The supporter 16 may be made of rubber or resin. Moreover, the supporter may be made of cork, paper, and cellulose-based members. In other words, the supporter may be made of anything if its material can fit the inside shape of the connector. There is no problem if the supporter 16 is disposed in a state in which the supporter is fitted into the inside of the connector 7 of the in-vehicle electronic device 1. Moreover, most rubber members can be used for the supporter 16. Specific examples include rubbers having molecular structures of a random copolymer, an alternating copolymer, a block copolymer, or a graft copolymer, and desirably silicone-based rubbers, fluorine-based rubbers, polyurethane-based rubbers, NBR, H-NBR, and EPDM rubbers.

Even if corrosive gases are generated from the counterpart connector 9 composition member, the corrosive gas is trapped by the trapping agent 17 held in the supporter 16 disposed in the in-vehicle electronic device 1 and can be prevented from its inflow into the inside of the case 4.

However, when the trapping effect of corrosive gases is considered, a material body having a high gas permeability like silicone rubber, cork or paper is made to be the supporter 16, and the trapping agent 17 is blended therewith, and the resulting supporter is disposed inside the connector, to thereby enhance the trapping effect. A silicone rubber, because the intermolecular force in its molecular structure is small and the steric hindrance is small, can permeate various kinds of gas materials. Cork and paper are porous, and have a steric structure through which a gas material easily passes. By blending the corrosive gas trapping agent 17 with the material body of a high permeability, the corrosive gas reaches the inside of the supporter 16 and is trapped inside even if the trapping agent 17 on the surface part is saturated and lose its trap ability. Hence, the life of the trapping effect of cork or paper can be longer than that of the trapping effect of a resin having a bad gas permeability, whereby the trap efficiency is increased.

The activated carbon 18 is easy to be treated as the trapping agent 17. For the activated carbon 18, various materials such as coconut husk and bamboo are used. When several kinds of the activated carbon 18 have been subjected to experiments, the most effective examples of the activated carbon include coconut husk activated carbon and artificially produced activated carbon. Although a detailed method of artificially produced activated carbon is uncertain, the raw material seems to be petroleum.

Besides the above materials, a metal 19 is effective as the trapping agent 17. Their shapes may include any forms like a powder, a bulk and a flake. Effective substances include silver, and copper; other effective substances include iron, cobalt, nickel, tin, zinc or alloys containing the presented metal. In addition, a material with which a chloride is blended is effective as a trapping agent. Although it is not expected that normal salts (sodium chloride: NaCl, $CaCl_2$: calcium chloride) exhibit a trapping effect for corrosive gases, calcium carbonate ($CaCO_3$) of a weak base and basic salts are ascertained to show trapping effects.

Setting and blending of the trapping agent 17 will be described hereinafter.

Although not showing adsorption, absorption, or suction for air and water vapor (the effect is small even if it shows), the activated carbon 18 exhibits adsorption, absorption, and suction for a specific molecule like corrosive gases. The activated carbon 18 indicates selectivity for a gas to be trapped. The activated carbon 18 indicates extremely strong adsorption, absorption, and suction for both neighboring polar and non-polar gases and traps them. In addition, a certain kind of activated carbon 18 chemically reacts with adsorbed, absorbed, and sucked corrosive gases and turn them into other substances on the surface of the activated carbon 18, thus permanently trapping them and having a large trapping effect on corrosive gases in some cases. Its realistic amount of blending is from 0.1 to 10 wt %. If being blended in too large an amount, the activated carbon 18 aggregates and loses its dispersibility and partially increases or decreases trap ability, becoming a factor of causing the generation of product variation for trap performance.

The activated carbon 18 exhibits electroconductivity and is short-circuited between the terminals 8 when it comes in contact with the terminal 8 of the connector 7, causing the malfunction of the circuit. Hence, attention needs to be paid to prevent the supporter from making contact with the terminal 8. Because of this, the supporter is desirably placed at the bottom of the connector formed of resin.

The metal 19 may be blended as the trapping agent 17 as described above instead of the activated carbon 18 of FIG. 10. Handling is the same as in the case of the activated carbon 18 and involves adding the metal 19 to the supporter 16 and forming. The metals 19 to be blended include silver, copper, iron, cobalt, nickel, tin, zinc or a presented metal-containing alloy powder, flake, and amorphous bulk. From the experimental results, particularly effective substances were silver and copper. The size of a substance is desirably 50 μm or less, and its realistic amount of blending is roughly from 0.1 to 10 wt %. In addition to those above, experiments have ascertained that blending of a basic salt such as calcium carbonate is also effective. This is because that many corrosive gases exhibit acidity, and therefore blending of a basic salt can lead to trapping of corrosive gases by neutralization.

Embodiment 2

Figure 11:
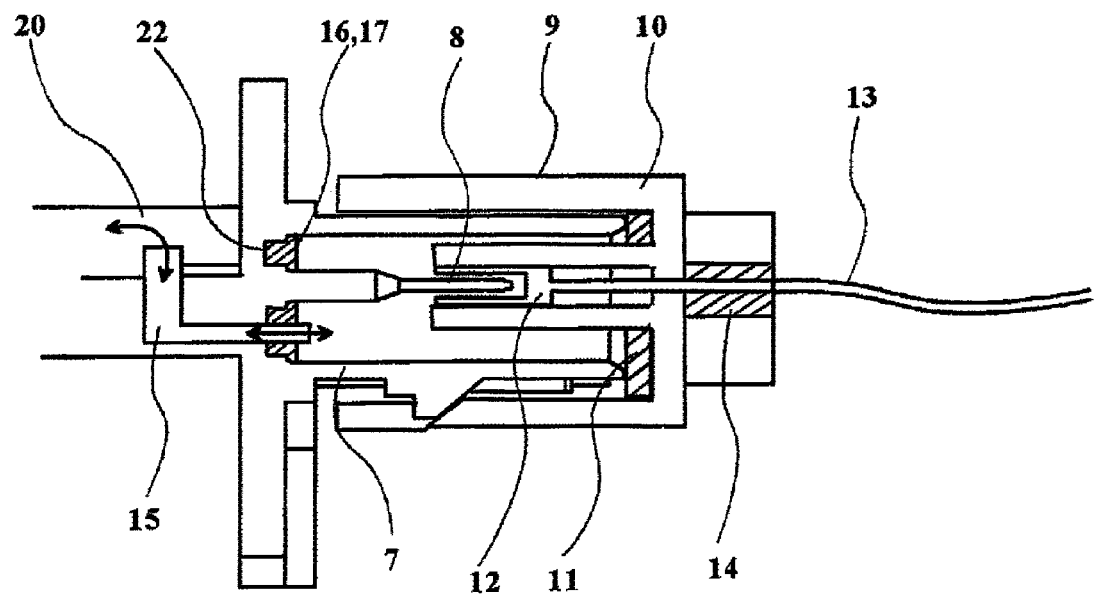
FIG. 11 is a sectional structural view in a connector fit part of an in-vehicle electronic device according to the present invention.

FIG. 11 shows another embodiment (Embodiment 2) according to the present invention. A groove 22 is formed in the bottom of the connector 7 of the in-vehicle electronic device 1, which has a structure in which the supporter 16 carrying the trapping agent 17 is embedded. The supporter 16 is fitted into the groove 22 and restrained to be thereby capable of preventing its displacement by vibration. Rubber, cork or paper is suitable as a member that becomes the supporter 16 that keeps this embedded trapping agent 17.

In addition, the trapping agent 17 may be blended with a paste of an adhesive or a mordant to perform potting in the groove 22 with a dispenser.

Furthermore, an adhesive tape with which the trapping agent 17 is blended may be applied to the inner wall or the inside of the connector.

Embodiment 3

Figure 12:
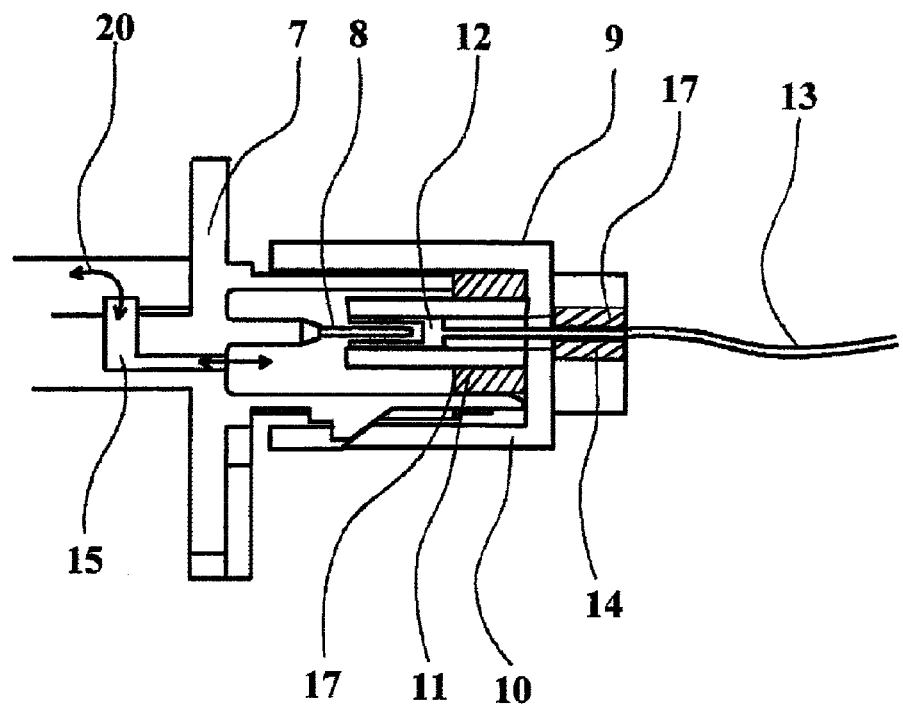
FIG. 12 is a sectional structural view in a connector fit part of an in-vehicle electronic device according to the present invention.
Figure 13:
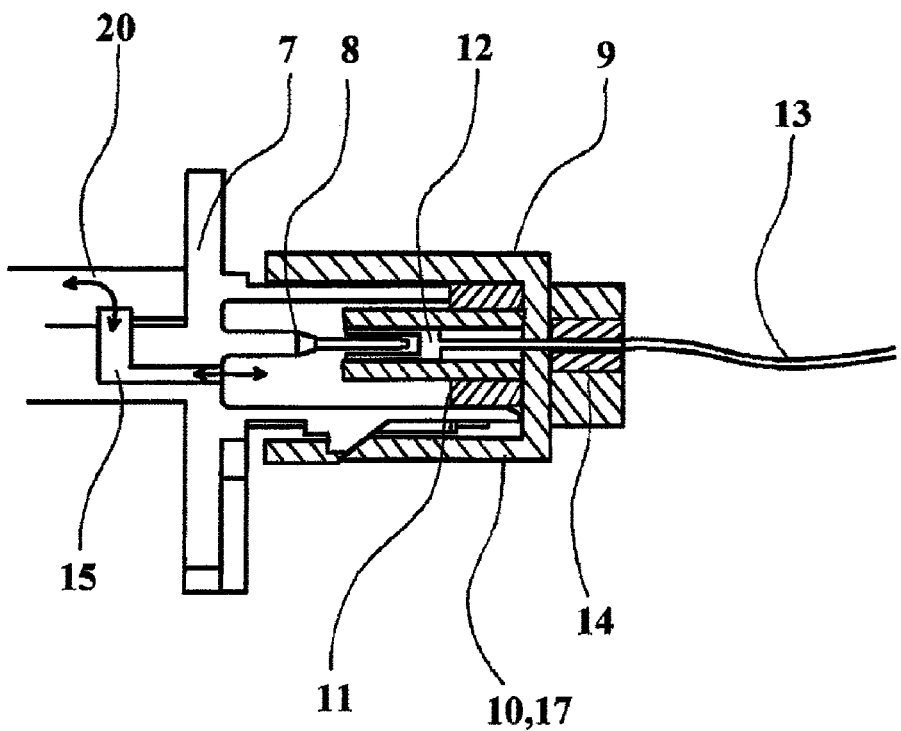
FIG. 13 is a sectional structural view in a connector fit part of an in-vehicle electronic device according to the present invention.

FIG. 12 shows another embodiment (Embodiment 3) according to the present invention. Although, in the embodiments described above, the trapping agent 17 is held at the connector 7 side of the in-vehicle electronic device 1, in this embodiment the trapping agent 17 is held at the side of the counterpart connector 9 that becomes a corrosive gas source. That is, a corrosive gas trapping function is imparted to the counterpart connector 9 itself. In any case, the trapping agent 17 is held within the space formed by use of the inside of the connector 7.

Figure 3:
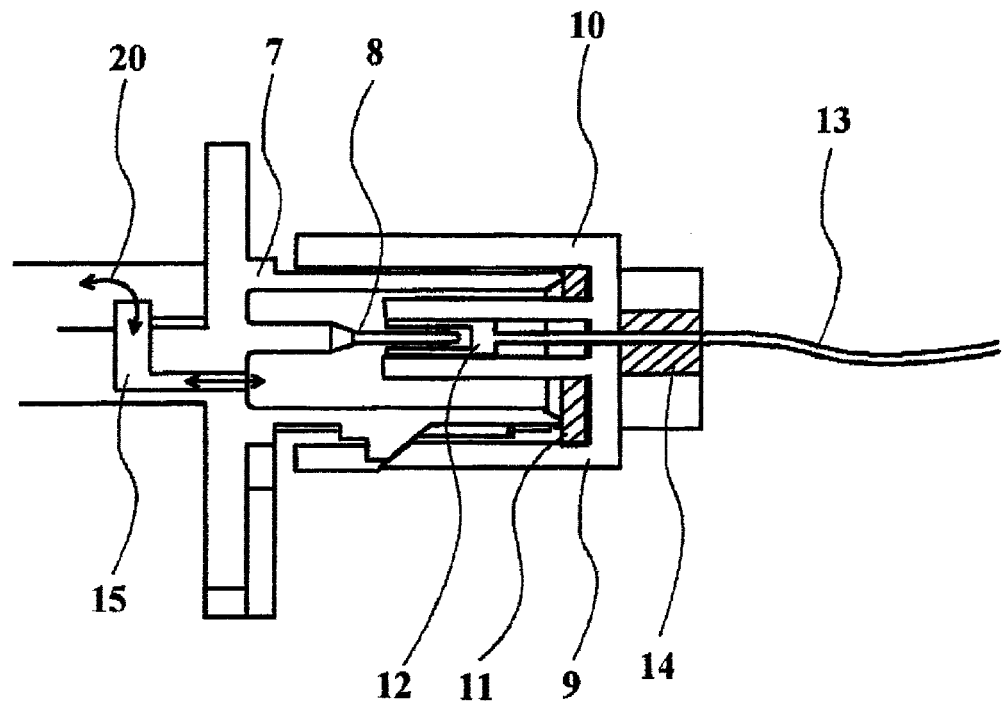
FIG. 3 shows a state where a general electronic device side connector is fitted to a counterpart connector.

In FIG. 12, the connector 7 of the in-vehicle electronic device 1 is fitted into the counterpart connector 9, and the waterproof rubber 11 of the counterpart connector 9 is used in order to prevent moisture intrusion from the outside. For the waterproof rubber 11, Grommet Rubber 14 is used. However, as described above, there are rubber members formed of rubber vulcanized with sulfur and blended with a variety of additives to improve heat stability, a change in the lapse of time, and injection-molding processability, and many sulfur compounds are used for these members. The sulfur that does not contribute to crosslinking, though added as a vulcanizing agent when the temperature rises, becomes a cyclic gas of the sulfur single substance with an increase of temperature and gushes out of the rubber surface. FIG. 3 also shows that the inside of the connector is in hermetic sealing after a fit and that corrosive gas generated from the waterproof rubber directly flows into the inside of the case 4 through ventilating hole 15.

The case of the Grommet Rubber 14 is the same as the above.

Use of rubber that does not generate corrosive gases can solve the above problem. However, in consideration of cost, productivity, and stability, an additive of a sulfur compound is an indispensable material for a vulcanized rubber, and it is difficult to use no additive of a sulfur compound under the present situation. It is also difficult to design a waterproof seal structure with a substitute without using rubber under the present situation.

In this embodiment, the trapping agent 17 is held inside the waterproof rubber 11 and the Grommet Rubber 14 to trap corrosive gases generated from rubber parts of the counterpart connector 9. In a molding process of rubber, the trapping agent 17 is blended and rubber is formed. The embodiments thus far had a structure to trap corrosive gases generated from rubber by using another material member. However, blending the waterproof rubber 11 and the Grommet Rubber 14 with the trapping agent 17 enables rubber itself to trap the gas and to prevent the corrosive gas from leaking from the rubber member. This structure does not need additional new parts. The number of assembly steps is small and assembly work can be performed without any changes in the present conditions.

Embodiment 4

Moreover, it is also effective to blend the trapping agent 17 with the coupler 10 of the counterpart connector as shown in FIG. 12. Like rubber, the coupler 10 is formed from polymer resin such as PBT, nylon (nylon 6, nylon 66, nylon 11, nylon 12), PET, PC (polycarbonate), or PPS. In the molding of the coupler 10, in many cases, a variety of stabilizers are blended in addition to an extender and a compounding ingredient for improving injection flowability considering a thin wall of a molded product. A sulfur compound is frequently used for an additive to be blended and thus a sulfur-based compound gas is generated from the surface of the coupler 10 when the temperature is increased. In addition, a mold lubricant is applied to an injection mold to mold a thin wall and complex shape. Therefore, a residue of the mold lubricant adheres on the surface of coupler 10 after molding. A sulfur compound may be still added to an inexpensive mold lubricant, so that the sulfur compound is possibly gushed, as a gas, out of the surface of the coupler 10 when the temperature is increased.

Hence, blending of the trapping agent 17 also with the coupler 10 enables the coupler 10 itself to be a supporter of the trapping agent 17 as well as to have a trapping function to thereby prevent corrosive gases from leaking therefrom. Although black carbon (graphite) is usually blended with a molded article such as the coupler 10 to make its appearance black, what makes it simpler is that the activated carbon 18 instead of this black carbon is blended with a molded article. When the metal 19 is blended, attention needs to be paid to its blending and dispersibility, and a material produced by applying organic surface treatment to the surface of the metal 19 for modification of its dispersibility may be used.

The activated carbon 18 itself has electroconductivity, and when the amount of blending is large, the coupler has electroconductivity. Therefore, the amount of blending is desirably roughly from 0.1 to 2 wt %.

Embodiment 5

Figure 14:
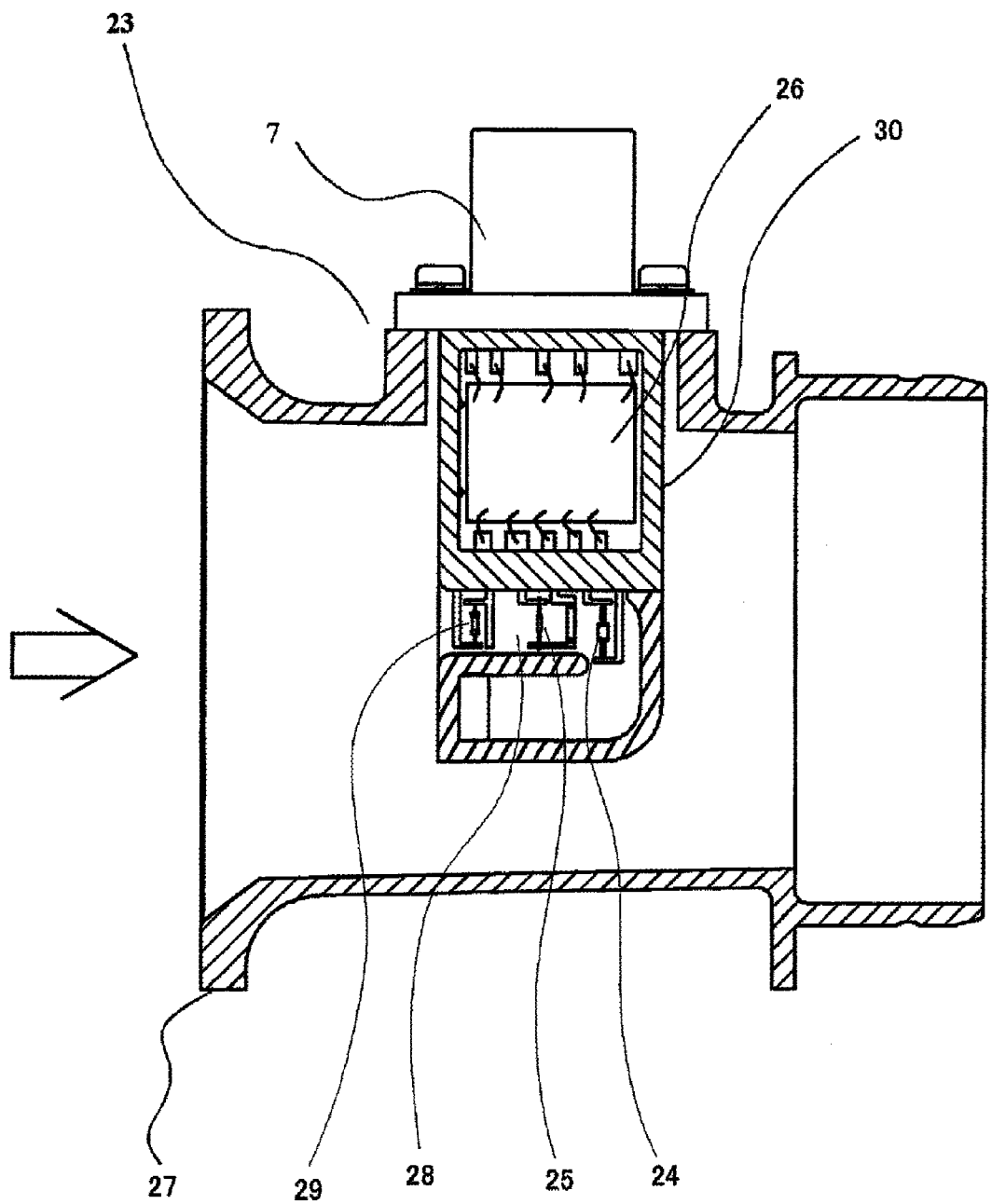
FIG. 14 is a sectional structural view of a thermal type air flowmeter as a specific case of an in-vehicle electronic device.

FIG. 14 shows a specific example of an air flowmeter installed as an in-vehicle electronic device according to the present invention. There are many examples of an in-vehicle electronic device. It is difficult to describe all of them, and thus an example of an air flowmeter 23 installed to measure an intake air flow will be set forth among those in-vehicle electronic devices. In addition, needless to say, the present invention can be applied not only to the air flowmeter 23 presented here, but to all of the in-vehicle electronic device having another function and another structure.

A thermal type air flowmeter that uses a heat element 24 and a temperature-sensitive resistor 25 is often used as the air flowmeter 23. The heat element 24 is controlled and constantly heated to a constant temperature by means of a constant temperature control circuit 26 so as to always maintain a constant temperature difference with respect to the temperature-sensitive resistor 25 that measures the temperature of air. The heat element 24 is placed in an air flow, so that the surface part of the heat element 24 that heat-radiates to an air flow is the heat radiation side and thus the heat transmission side. The amount of heat that is deprived by the air flow via this heat transmission is converted into an electrical signal and the air flow rate is measured.

With its entire structure, in a body 27 that holds the thermal type flowmeter 23 while introducing inhalation air, the heat element 24, the temperature-sensitive resistor 25, and a temperature sensor 29 for inhalation air temperature measurement are arranged in a sub-passage 28 into which a part of the total amount of flow flows. These resistor elements and the constant temperature control circuit 26 transmit an electrical signal through the terminal 8 made of the electroconductivity member embedded in a housing case 30.

Application of the present invention to the connector 7 part of the air flowmeter 23 or to the counterpart connector 9 makes it possible to prevent corrosive gases generated from the counterpart connector 9 from intruding into the inside of the housing case 30 through the ventilating hole 15 and to provide an in-vehicle electronic device that has an effective structure as a protecting structure against corrosive gases.

EXPLANATION OF REFERENCE NUMERALS

1 . . . An in-vehicle electronic device, 2 . . . Electronic driving circuit, 3 . . . Base, 4 . . . Case, 5 . . . Cover, 6 . . . Hybrid IC substrate, 7 . . . An in-vehicle electronic device side connector, 8 . . . Terminal, 9 . . . Counterpart connector, 10 . . . Coupler, 11 . . . Waterproof rubber, 12 . . . Terminal, 13 . . . Wire harness, 14 . . . Grommet Rubber, 15 . . . Ventilating hole, 16 . . . Supporter, 17 . . . Corrosive gas trapping agent, 18 . . . Activated carbon, 19 . . . Metal-blended agent, 20 . . . Air or water vapor, 21 . . . Corrosive gas, 22 . . . Groove, 23 . . . Air flowmeter, 24 . . . Heat element, 25 . . . Temperature-sensitive resistor, 26 . . . Driving circuit, 27 . . . Body, 28 . . . Sub-passage, 29 . . . Temperature sensor, 30 . . . Housing case

What is claimed is:

1. An in-vehicle electronic device comprising:
an electronic circuit;
a case that houses the electronic circuit;
a connector having a terminal insert-molded in the case;
a ventilating hole that places an interior of the case in communication with an interior of the connector; and
a trapping agent held within the interior of connector;
wherein, the trapping agent has a trap performance for corrosive gases other than water, which is higher than its trap performance for water vapor.

2. The in-vehicle electronic device according to claim 1, wherein
the trapping agent is a trapping agent that traps corrosive gases by any one of adsorption, suction, absorption and chemical reaction, and is held by a supporter having any one of an o-ring shape and a square-ring shape with a polygonal cross-section, that fits on an inner periphery of the connector.

3. The in-vehicle electronic device according to claim 1, wherein
the trapping agent is held by a supporter embedded in a groove part formed in the bottom of the connector of the in-vehicle electronic device.

4. The in-vehicle electronic device according to claim 1, wherein
a paste with which the trapping agent is blended is potted in a bottom portion of the connector.

5. The in-vehicle electronic device according to claim 1, wherein
the trapping agent is held within the connector by means of applying, bonding or sticking the trapping agent to the inside of the connector.

6. The in-vehicle electronic device according to claim 1, wherein
the trapping agent is formed of any one of: activated carbon; silver; copper; iron; cobalt; nickel; tin; zinc; an alloy containing any of those metals; and basic substances including calcium carbonate.

7. The in-vehicle electronic device according to claim 1, wherein
the supporter of the trapping agent is formed of any one of: rubber having a molecular structure of any one of random copolymers, alternating copolymers, block copolymers and graft copolymers; and any rubber of silicone-based rubber, fluorine-based rubber, polyurethane-based rubber, NBR, H-NBR, and EPDM rubber.

8. The in-vehicle electronic device according to claim 1, wherein
any one of: a molded product mainly made of cork or paper; a cellulose-based member; a molded product mainly made of fiber or a polymeric substance; and fiber is used as a supporter holding the trapping agent.

9. An in-vehicle electronic device
an electronic circuit;
a case housing the electronic circuit;
a connector having a terminal insert-molded in the case;
a counterpart connector fitted and electrically connected to the connector;
a ventilating hole that places an interior of the case in communication with an interior of the connector; and
a trapping agent held within the counterpart connector;
wherein, the trapping agent has a trap performance for corrosive gases other than water, which is higher than its trap performance for water vapor.

10. The in-vehicle electronic device according to claim 9, wherein
the trapping agent is any one of activated carbon, a metal powder, and a basic substance such as calcium carbonate.

11. The in-vehicle electronic device according to claim 9, wherein
a coupler making up the counterpart connector holding the trapping agent is any one of polybutyrene terephthalate (PBT), nylon, polyethylene terephthalate (PET), polycarbonate (PC), polypropylene (PP), polyphenylene sulfide (PPS), and polyimide.

12. The in-vehicle electronic device according to claim 9, further comprising at least one of a waterproof rubber and a grommet rubber, that is formed of any one of: rubber having a molecular structure of any one of random copolymers, alternating copolymers, block copolymers and graft copolymers; and any rubber of silicone-based rubber, fluorine-based rubber, polyurethane-based rubber, NBR, H-NBR, and EPDM rubber,
wherein the trapping agent is held in the at least one of the waterproof rubber and the grommet rubber.

13. The in-vehicle electronic device according to claim 1, wherein the in-vehicle electronic device is a thermal type flowmeter for measuring the amount of gas that flows in an intake pipe of an internal combustion device.

* * * * *